(12) United States Patent
Virloget

(10) Patent No.: US 8,409,432 B2
(45) Date of Patent: Apr. 2, 2013

(54) INSTALLATION FOR THE TREATMENT OF WASTEWATERS AND BIOLOGICAL DISC FOR SUCH AN INSTALLATION

(75) Inventor: Francoís Virloget, Saint Priest (FR)

(73) Assignee: Degremont, Paris la Defense (FR)

( * ) Notice: Subject to any disclaimer, the term of this patent is extended or adjusted under 35 U.S.C. 154(b) by 260 days.

(21) Appl. No.: 12/742,857

(22) PCT Filed: Nov. 6, 2008

(86) PCT No.: PCT/FR2008/001563
§ 371 (c)(1),
(2), (4) Date: Oct. 5, 2010

(87) PCT Pub. No.: WO2009/092915
PCT Pub. Date: Jul. 30, 2009

(65) Prior Publication Data
US 2011/0017647 A1    Jan. 27, 2011

(30) Foreign Application Priority Data

Nov. 14, 2007 (FR) ...................................... 07 07997

(51) Int. Cl.
*C02F 3/08* (2006.01)
(52) U.S. Cl. ...................................... 210/150; 210/619
(58) Field of Classification Search .................. 210/150, 210/151, 619
See application file for complete search history.

(56) References Cited

U.S. PATENT DOCUMENTS

| | | | | |
|---|---|---|---|---|
| 3,389,798 A | | 6/1968 | Hartmann et al. | |
| 3,827,559 A | * | 8/1974 | Gass et al. ..................... | 210/150 |
| 3,904,525 A | * | 9/1975 | Rosenberg .................... | 210/150 |
| 4,532,035 A | * | 7/1985 | Fuchs et al. ................... | 210/150 |
| 4,549,962 A | * | 10/1985 | Koelsch ........................ | 210/150 |
| 4,690,755 A | | 9/1987 | Friedman et al. | |
| 4,956,082 A | * | 9/1990 | Choi ............................. | 210/150 |
| 5,395,529 A | * | 3/1995 | Butler .......................... | 210/619 |
| 5,425,874 A | | 6/1995 | Gass | |
| 6,783,669 B1 | * | 8/2004 | Okagawa et al. ............. | 210/150 |
| 7,156,986 B2 | * | 1/2007 | Warrow ........................ | 210/150 |

FOREIGN PATENT DOCUMENTS

| | | |
|---|---|---|
| DE | 1584909 A1 | 11/1969 |
| EP | 0182380 A2 | 5/1986 |
| EP | 0324314 A1 | 7/1989 |

* cited by examiner

*Primary Examiner* — Christopher Upton
(74) *Attorney, Agent, or Firm* — Novak Druce Connolly Bove + Quigg LLP

(57) ABSTRACT

Installation for the treatment of municipal and/or industrial wastewaters comprising a basin that receives the water to be treated and a series of discs (4) having a packing (G) that are parallel and vertical, mounted on a horizontal shaft (5), partially submerged in the water to be treated, and rotated so that the biomass which grows on the surface of the packing of the discs is alternately brought into contact with the water to be treated and oxygen from the air. The configuration of the packing (G) of the discs (4) is chosen so that the developed surface area of the packing in one zone of the disc increases with the distance from this zone to the axis of rotation (X-X).

8 Claims, 3 Drawing Sheets

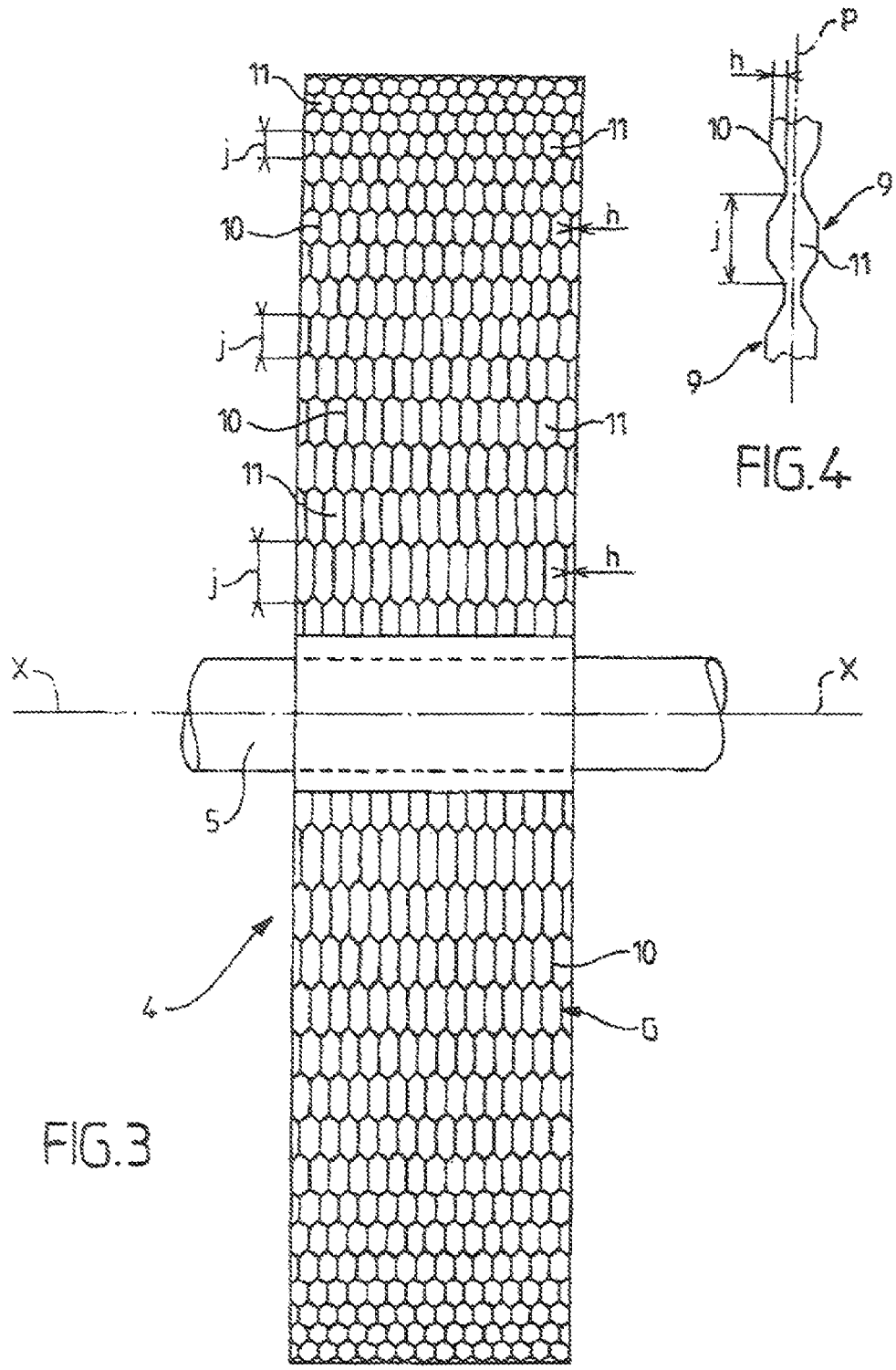

INSTALLATION FOR THE TREATMENT OF WASTEWATERS AND BIOLOGICAL DISC FOR SUCH AN INSTALLATION

CROSS REFERENCE TO RELATED APPLICATIONS

This application is a National Phase filing under 35 U.S.C. §371 of PCT/FR2008/001563 filed on Nov. 6, 2008; and this application claims priority to application Ser. No. 0707997 filed in France on Nov. 14, 2007 under 35 U.S.C. §119; the entire contents of all are hereby incorporated by reference.

BACKGROUND OF THE INVENTION

The invention relates to an installation for the treatment of municipal and/or industrial wastewater, comprising a basin that receives the water to be treated and a series of disks with packing, said disks being parallel, vertical mounted on a horizontal shaft, partially immersed in the water to be treated and rotated in such a way that the biomass that grows on the surface of the packing of the disks is alternately brought into contact with the water to be treated and with oxygen from the air by a trickling effect.

Such an installation is particularly suitable for treating the wastewater from towns or communities having 2000 equivalent inhabitants (EI) or fewer.

Taking the example of France which has over 36 000 towns, there are about 34 650 towns with fewer than 2000 inhabitants, which corresponds to a population of about 25 000 000 inhabitants, i.e. about 40% of the total population of France.

The national stock of purification plants in France is made up of about 15 000 purification plants, about 60% of which smaller in size than 2000 EI. Close to 50% of these small installations are over 15 years old, while 30% are over 20 years old. It may therefore be considered that this old stock will be renewed in the short term.

Biological treatment by activated sludge has often been the treatment of choice, although this technique is not suited to such small installations because of the high investment costs and above all a high operating cost. The efficiency of activated-sludge installations is often mediocre for capacities of less than 2000 EI.

The alternatives to treatment by activated sludge for small installations are mainly treatment systems employing bacterial beds, natural lagoons, filters planted with rushes, biological disks.

The biological disk technology is widely used throughout the world, especially in northern Europe, and is perfectly suited to the smallest installations ranging in size from a few tens to a few thousand equivalent inhabitants. The compactness and low height of biological disk installations are major advantages for integrating them discretely into exacting sites. It is even possible to integrate these installations into building basements or into small separate buildings. Their low electrical consumption is noteworthy.

In particular in France, the objectives and constraints of the new Decree of Jun. 22, 2007 "relatif à la collecte, au transport et au traitement des eaux usées des agglomérations d'assainissement ainsi qu'à la surveillance de leur fonctionnement et de leur efficacité, et aux dispositifs d'assainissement non collectif recevant une charge brute organique supérieure à 1.2 kg/j de DBO$_5$ [relating to the collection, transportation and treatment of wastewater from sewage catchment areas and also to the monitoring of their operation and their efficiency, and to noncommunal treatment plants receiving raw water with a BOD$_5$ organic content greater than 1.2 kg/d]" (20 equivalent inhabitants) published in the *Journal Officiel* [Official Journal] dated Jul. 14, 2007, have been met.

| Parameter | Max. concentration | Min. efficiency |
|---|---|---|
| BOD$_5$ | 35 mg/l | 60% |
| COD | | 60% |
| SM | | 50% |

It will be recalled that the expression BOD$_5$ denotes the biochemical oxygen demand measured at the end of 5 days, COD denotes the chemical oxygen demand and SM denotes the suspended matter.

The treatment of wastewater using biological disk technology involves the process of attached growths. The purifying biomass grows on the rotating disks and their packing, especially a plastic packing with, a specific surface area close to 150 m$^2$/m$^3$. The amount of biomass that will grow on the support depends on the specific surface area of the contacting material and on the thickness of the biofilm, which can vary from a few hundred microns to several millimeters.

In the case of biological disks, the support for the attached growths can rotate about an axis. The rotation of the disks enables the biomass to be brought into contact with the pollution to be treated and to oxygenate the medium through the water trickling effect when the zone bearing the biomass leaves the liquid.

The linear speed of the disk relative to the water is higher toward the outside than at the center, and the trickling is thus greater toward the periphery of the disk, with better oxygenation and more effective erosion of the biofilm. In fact, it is found in treatment units that the biofilm can reach a thickness of several millimeters near the rotation axis, whereas this thickness is smaller to the outside.

The surface layer of the biofilm remains an aerobic zone, but the deep layers are in a state of anaerobiosis (significant black layers). This generally observed situation prevents the treatment from being optimized.

In addition, the area wetted per revolution is considerably greater to the outside than to the inside of the disks (about ten times greater for the example of a 2 m diameter).

Consequently, the further away from the center, the thinner the biofilm, the better the oxygenation and the higher the contact area. It is therefore advantageous to increase a developed surface area to the outside of the disks.

To approximate the notion of a load to be treated per quantity of biomass (volume load of activated sludge), it is general practice to refer to a surface load: gBOD$_5$/d per m$^2$ of developed surface area. The oxygenation capacity is low, which means that the charge to be treated is limited, especially on the first stage for disks arranged in series. Because of this low oxygenation capacity, it is not possible in general to use biological disk technology as first treatment step, before a complementary biological treatment. Furthermore, it is difficult to envisage this biological disk technology in tertiary treatment for just nitrogen treatment (nitrification) due to the impossibility of controlling the thickness of the biofilm, which necessarily has to be very thin for this specific treatment.

Thus, according to the prior art, treatment using biological disks is generally reserved for the main treatment, for the elimination of carbon-containing pollution, and, to a lesser extent, for nitrogen-containing pollution with limited nitrification performance.

EP-A-0 182 380 relates to an installation for the treatment of wastewater using a series of disks or drums with packing, which are parallel, mounted on a horizontal shaft, partially immersed in the water to be treated and rotated. According to one embodiment, the packing of the drums is formed by tubes comprising latices or networks. The abovementioned drawbacks remain in such an installation.

SUMMARY OF THE INVENTION

The primary object of the invention is to optimize the process aspect of biological disk technology through better control of the amount of biomass in place in the treatment, of the oxygenation capacity of the system and of the performance as regards nitrogen treatment (nitrification and denitrification).

Another object of the invention is to improve the purifying performance of biological disk treatment units thanks to better control of the thickness of the biofilm over the entire packing, and optimization of the conditions for oxygenating the medium.

By maintaining a thin biofilm, especially with a thickness of a few hundred microns, over the entire surface of the packing material of the biological disks it is possible to maintain a biological reaction zone under predominantly aerobic conditions and therefore to optimize the treatment.

According to the invention, an installation for the treatment of municipal and/or industrial wastewater, comprising a basin that receives the water to be treated and a series of disks with packing, said disks being parallel vertical and mounted on a horizontal shaft, these disks being partially immersed in the water to be treated and rotated in such a way that the biomass that grows on the surface of the packing of the disks is alternately brought into contact with the water to be treated and with oxygen from the air, the configuration of the packing of the disks being chosen in such a way that the developed surface area of the packing in one zone of the disk increases with the distance of this zone from the rotation axis, so as to develop an increasing contact area on approaching the outside of the disk, and is characterized in that the packing has corrugations along a direction transverse to the mean plane of the disk and the frequency of the corrugations along the radial direction increases with the distance from the rotation axis, whereas the amplitude of the corrugations along a direction transverse to the mean plane of the disk remains approximately constant.

The frequency of the corrugations along the radial direction may be proportional to the distance from the rotation axis.

The packing may be composed of plates having corrugations of constant amplitude and variable frequency, which plates are arranged symmetrically against one another so as to form channels that open into radial spaces.

This makes it possible to achieve a higher developed surface area toward the outside of the disk than toward the center, with a gradual variation in the frequency as a function of the distance from the axis.

This configuration is conducive to a uniform biofilm thickness whatever the rotation speed of the disk. The rotation speeds must remain slow enough not to generate a centrifugal force effect, these speeds ranging from about a few revolutions per minute to a few tens of revolutions per minute.

According to another aspect of the invention, the installation for the treatment of municipal and/or industrial wastewater is characterized in that it includes a variable speed device for rotating the disks and for adapting the thickness of the biofilm by varying the rotation speed.

Preferably, the variable speed device is designed to provide a range of disk rotation speeds of between 5 and 25 rpm, mainly to ensure treatment of the carbon-containing pollution, and a range of slower speeds, of between 0.1 rpm and 0.5 rpm, for a denitrification treatment.

A more rapid speed makes it possible to accelerate the trickling and the erosion, and therefore to reduce the thickness of the biofilm. This increase in speed also helps to improve the oxygenation of the medium and therefore to meet high oxygen demands, for example for dealing with a pollution peak, or for a first treatment stage, or for a nitrification.

A slower speed makes it possible to decrease the trickling and the erosion and therefore to maintain a greater thickness of the biofilm. This lower speed over a relatively long time (several tens of minutes) will result, to a certain extent, in a significant reduction in the oxygenation of the medium while still maintaining contact between the biomass and the substrate. This results in an anoxic period for eliminating the nitrate nitrogen by biological denitrification. This time must be short (10 to 30 minutes) in order to guarantee good quality of the discharge, the buffer power in this kind of construction being limited except by installing a facility for storing some of the raw effluent to be treated during this period of anoxia. Such a situation can therefore no longer meet strong oxygen demands: pollution peak, first treatment stage, nitrification. However, it is possible for a limited time to maintain this low speed in order to ensure denitrification of the nitrogen (reduction in nitrate nitrogen) without prejudice to the level of treatment of the carbon-containing pollution.

By alternating between ranges of high rotation speed and low rotation speed it is possible, with an adapted surface load, to obtain good performance in eliminating nitrogen by nitrification-denitrification.

The invention also relates to a biological disk with packing, for an installation as defined above, in which the configuration of the packing of the disk is chosen in such a way that the developed surface area of the packing in one zone of the disk increases with the distance of this zone from the axis of the disk, characterized in that the packing has corrugations along a direction transverse to the mean plane of the disk and the frequency of the corrugations along the radial direction increases with the distance from the axis of rotation, whereas the amplitude of the corrugations along a direction transverse to the mean plane of the disk remains approximately constant.

The packing may be composed of plates with corrugations of constant amplitude and of variable frequency that are placed symmetrically against one another so as to form channels. The packing may be formed by an assembly of trapezoidal sectors, the short base of which is in the vicinity of the geometrical axis of the disk and the long base of which is in the vicinity of the external perimeter of the disk, two adjacent sectors being separated by a radial space.

BRIEF DESCRIPTION OF THE DRAWINGS

The invention consists, apart from the arrangements explained above, of a number of other arrangements which will be explained in greater detail below with regard to an exemplary embodiment described with reference to the appended drawings, although this embodiment is in no way limiting. In these drawings:

FIG. 3 is a cross section on a larger scale on the line III-III of FIG. 2, illustrating a disk with packing according to the invention;

FIG. 4 is a cross-sectional detail on a large scale of two packing plates during assembly.

DETAILED DESCRIPTION OF THE INVENTION

Figure 1:
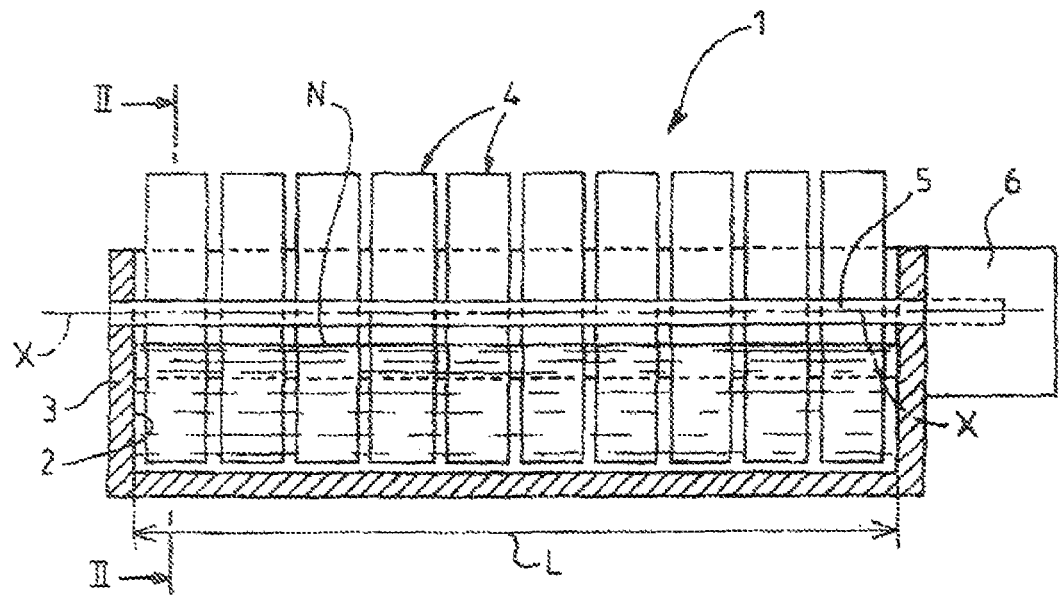
FIG. 1 is a schematic vertical axial section of a treatment installation using biological disks according to the invention.
Figure 2:
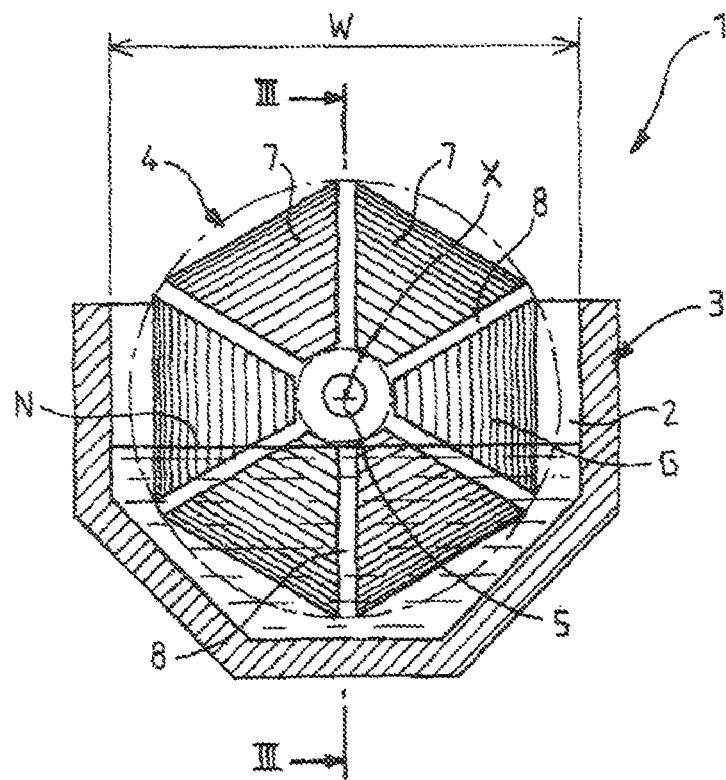
FIG. 2 is a schematic section in a plane orthogonal to the rotation axis along the line II-II of FIG. 1.
Figure 5:
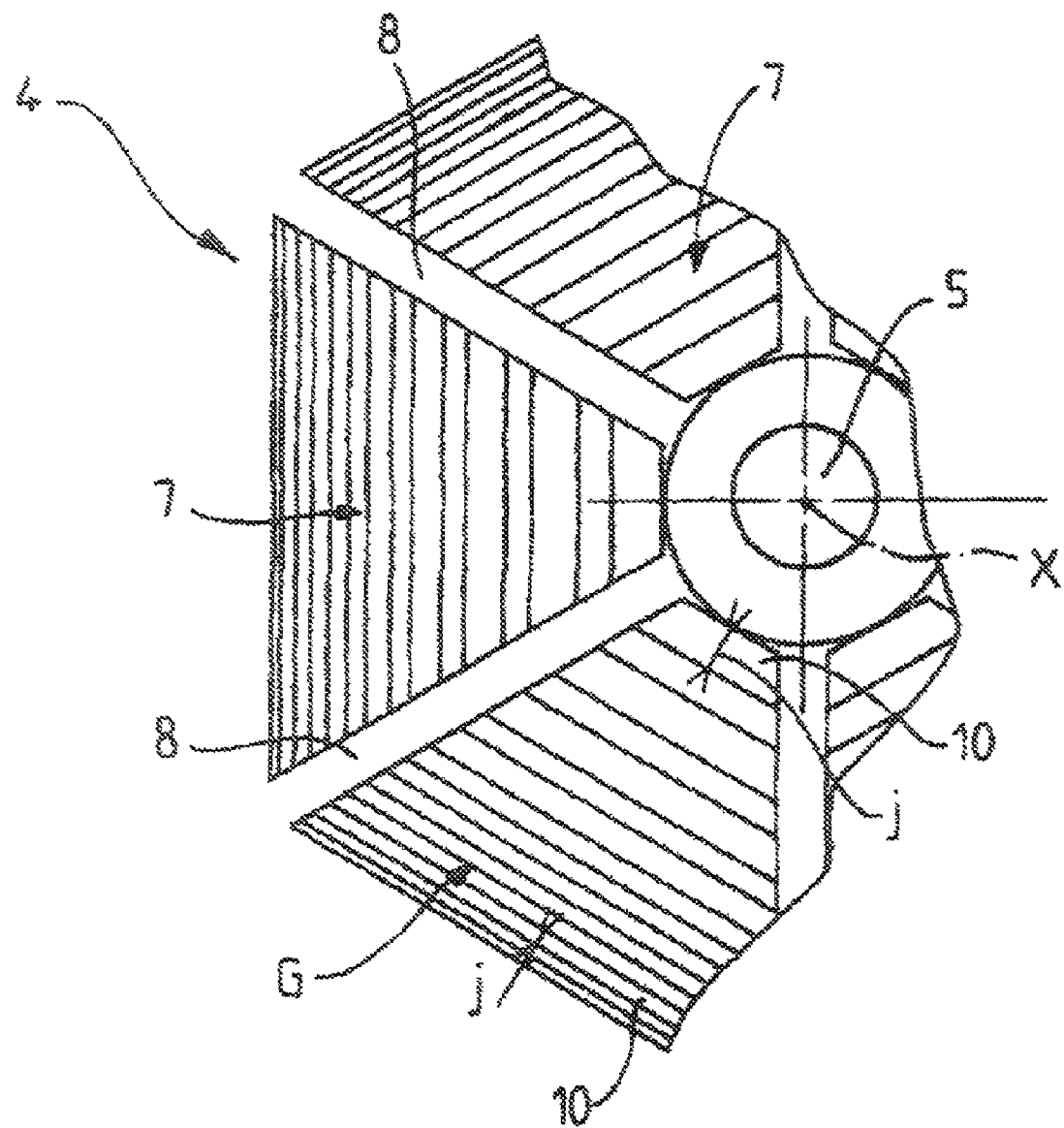
FIG. 5 is a partial view on the left, on a smaller scale, of the disk of FIG. 3.

The drawings, especially FIGS. 1 and 2, show an installation 1 for the treatment of municipal and/or industrial wastewater comprising a basin 2 formed by the internal volume of a tank or trough 3. As may be seen in FIG. 2, the tank has two vertical parallel opposed walls joined to a horizontal bottom wall, especially by two downwardly converging walls, particularly converging at 45°. Advantageously, the dimensions of the tank 3 enable it to be transported by road. To give an indication, the internal length L (FIG. 1) of the tank may be around 6 m, whereas its internal width W (FIG. 2) may be around 2.5 m. An intake (not shown) for the water to be treated is provided so as to fill the tank 3 up to a level N. An outlet (not shown) for the treated water is also provided. Preferably, the treatment is carried out continuously.

The installation comprises a series of parallel vertical disks 4, fastened to a horizontal shaft 5, mounted so as to rotate in bearings provided in the end walls of the tank 3. The shaft 5 passes through one of the end walls of the tank so as to engage with a rotary drive system 6.

The disks 4 have a packing G designed to allow the biomass to grow on its surface. The disks 4 thus have an axial thickness and constitute drums. The disks 4 are partially immersed in the water to be treated, generally over about 40% of their surface. The disks and packings may be made of polyethylene, PVC or another plastic.

As may be seen in FIG. 2, the packing G of a disk 4 may be formed by an assembly of six trapezoidal, preferably isosceles, sectors 7, the short base of which is close to the shaft 5 and the long base of which is close to the outer perimeter of the disk 4. Two adjacent sectors 7 are separated by a radial space 8. The sectors 7 may be supported by a support structure (not shown).

The configuration of the disk packing G is chosen in such a way that the developed surface area of the packing in one zone of the disk increases with the distance of this zone from the geometrical or rotation axis X-X. The developed surface area of a corrugated zone corresponds to the area of the zone when it is flattened, i.e. opens out into a plane.

Advantageously, the packing G is formed by plates 9 having corrugations 10 (FIG. 3) of trapezoidal appearance along a direction transverse, essentially perpendicular, to the mean plane of the disk. The amplitude h (FIG. 3) of the corrugations along a direction orthogonal to the disk is preferably constant. In contrast, the frequency of the corrugations increases with the distance from the rotation axis. In other words, the radial dimension j of the corrugations decreases as the distance from the rotation axis increases. The developed surface area of a zone of the plate 9 thus increases with the distance of this zone from the rotation axis.

As may be more clearly seen in FIG. 4 in which two plates in the course of being assembled are partially shown, the plates 9 are placed against each other symmetrically with respect to a plane P orthogonal to the rotation axis so as to form channels such as 11, the cross section of which, hexagonal in the example shown, decreases as the radial distance from the rotation axis increases. The plates 9, especially when they are made of plastic, may be assembled by adhesive bonding.

Seen from the front, as in FIG. 3, the configuration of the packing resembles a honeycomb configuration, giving it good rigidity. The channels 11 open at each end into a radial space 8. The water to be treated passes through the channels 11 during rotation of the disk 4. The dimensions of the cross section of the channels 11 are kept sufficient (width and height at least equal to about 15 mm) to prevent the channels from being blocked by the biofilm and other solid particulates in the raw water to be treated.

Advantageously, the frequency of the corrugations 10 along the radial direction is approximately proportional to the distance from the rotation axis.

The rotary drive system 6 includes a variable speed device for modifying the rotation speed of the disks 4.

A range of relatively high speeds, especially from 5 to 25 rpm, is used to ensure good oxygenation of the biofilm and principally the treatment of the carbon-containing pollution. A range of lower speeds, especially between 0.1 rpm and 0.5 rpm, is used for a treatment under anoxic conditions and for nitrate reduction, that is to say for carrying out a denitrification treatment.

Furthermore, the rotation speed may be modified according to the temperature and the desired thickness of the biofilm.

The configuration of the packing G makes it possible to have a greater developed surface area in the rotation zones where the linear output speed of the water is higher. Thanks to this configuration, the biofilm thickness is controlled.

The same installation makes it possible to treat the carbon-containing pollution by rotating the disks 4 at a relatively high speed, between 5 and 25 rpm, which is favorable to oxygenation.

During another phase, by reducing the rotation speed to a value below 0.5 rpm, it is possible to denitrify the treated water.

The packing configuration adopted prevents the biofilm from thickening close to the rotation axis.

The invention claimed is:

1. An installation for the treatment of municipal and/or industrial wastewater, comprising a basin that receives the water to be treated and a series of disks with packing, said disks being parallel, vertical, mounted on a horizontal shaft, partially immersed in the water to be treated and being rotatable in such a way that the biomass that grows on the surface of the packing of the disks is alternately brought into contact with the water to be treated and with oxygen from the air, wherein the packing of the disks is configured in a plurality of zones, with radial spaces between adjacent zones, and the developed surface area of the packing in each zone of the disk increases with the distance of this zone from the rotation axis, thereby developing an increasing contact area on approaching the outside of the disk, wherein the packing has corrugations along a direction transverse to the mean plane of the disk, the corrugations opening up into the radial spaces between adjacent zones, and the frequency of the corrugations along the radial direction increases with the distance from the rotation axis, whereas the amplitude of the corrugations along a direction transverse to the mean plane of the disk remains approximately constant.

2. The installation as claimed in claim 1, wherein the frequency of the corrugations along the radial direction is proportional to the distance from the rotation axis.

3. The installation as claimed in claim 1, wherein the packing is composed of plates having corrugations of constant amplitude and variable frequency, which plates are arranged symmetrically against one another so as to form channels that open into radial spaces.

4. The installation as claimed in claim 1, wherein the rotatary drive system includes a variable speed device for rotating the disks and for adapting the thickness of the biofilm by varying the rotation speed.

5. The installation as claimed in claim 4, wherein the variable speed device is designed to provide a range of disk rotation speeds of between 5 and 25 rpm, mainly to ensure treatment of the carbon-containing pollution, and a range of slower speeds, of between 0.1 rpm and 0.5 rpm, for a denitrification treatment.

6. A biological disk with packing for an installation, the installation including a basin that receives the water to be treated, said biological disk being vertical, mounted on a horizontal shaft, partially immersed in the water to be treated, and being rotatable in such a way that the biomass that grows on the surface of the packing of the disk is alternately brought into contact with the water to be treated and with oxygen from the air, the packing of the disk is configured in a plurality of zones, with radial spaces between adjacent zones, and the developed surface area of the packing in each zone of the disk increases with the distance of this zone from the geometrical axis of the disk, wherein the packing has corrugations along a direction transverse to the mean plane of the disk, the corrugations opening up into the radial spaces between adjacent zones, and the frequency of the corrugations along the radial direction increases with the distance from the geometrical axis of the disk, whereas the amplitude of the corrugations along a direction transverse to the mean plane of the disk remains approximately constant.

7. The biological disk as claimed in claim 6, wherein the packing is composed of plates with corrugations of constant amplitude and of variable frequency that are placed symmetrically against one another so as to form channels.

8. The biological disk as claimed in claim 7, wherein the packing is formed by an assembly of trapezoidal sectors, the short base of which is in the vicinity of the geometrical axis of the disk and the long base of which is in the vicinity of the external perimeter of the disk, two adjacent sectors being separated by a radial space.

* * * * *